United States Patent
Sawa et al.

(10) Patent No.: US 9,254,753 B2
(45) Date of Patent: Feb. 9, 2016

(54) TRAIN-INFORMATION MANAGEMENT DEVICE AND DEVICE CONTROL METHOD

(75) Inventors: Takuya Sawa, Chiyoda-ku (JP);
Tomoaki Ikejima, Chiyoda-ku (JP);
Tetsuo Komura, Chiyoda-ku (JP);
Shogo Tatsumi, Chiyoda-ku (JP);
Shingo Honda, Chiyoda-ku (JP);
Toshiko Kadono, Chiyoda-ku (JP);
Takashi Miyauchi, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/421,097

(22) PCT Filed: Aug. 14, 2012

(86) PCT No.: PCT/JP2012/070699
§ 371 (c)(1),
(2), (4) Date: Feb. 11, 2015

(87) PCT Pub. No.: WO2014/027401
PCT Pub. Date: Feb. 20, 2014

(65) Prior Publication Data
US 2015/0191090 A1    Jul. 9, 2015

(51) Int. Cl.
*B61D 27/00*    (2006.01)
*B60L 7/18*    (2006.01)
(Continued)

(52) U.S. Cl.
CPC . *B60L 7/18* (2013.01); *B60L 1/003* (2013.01); *B60L 7/10* (2013.01); *B60L 7/14* (2013.01); *B60L 9/22* (2013.01); *B60L 15/2045* (2013.01); *B61D 27/0018* (2013.01); *B60L 2200/26* (2013.01); *B60L 2240/36* (2013.01); *Y02T 10/7283* (2013.01)

(58) Field of Classification Search
USPC ............................................................. 701/19
See application file for complete search history.

(56) References Cited

U.S. PATENT DOCUMENTS

| 2,704,813 | A | * | 3/1955 | Stamm | B60L 7/00 105/26.05 |
| 2003/0173125 | A1 | * | 9/2003 | Ishikawa | B60K 6/485 180/65.26 |

(Continued)

FOREIGN PATENT DOCUMENTS

JP    58-089005 A    5/1983
JP    01-270703 A    10/1989
(Continued)

*Primary Examiner* — Shelley Chen
(74) *Attorney, Agent, or Firm* — Buchanan Ingersoll & Rooney PC

(57) ABSTRACT

The present invention includes a position detection unit; a regenerating-condition detection unit; a train-line information holding unit that holds therein information on a section in which a train is more likely to use a brake; an air-conditioning set-value holding unit that holds therein a temperature set value of an air conditioner; and a target-temperature control unit that decides a target temperature. In a regeneration-preparation condition in which a train is running through a position at which the distance between the position and a section in which a train is more likely to use a brake is equal to or less than a given value and in which the train does not use a regenerative brake, the target-temperature control unit decides a value, generated by adding a predetermined value to the temperature set value, as the target temperature.

4 Claims, 4 Drawing Sheets

(51) Int. Cl.
*B60L 1/00* (2006.01)
*B60L 7/14* (2006.01)
*B60L 9/22* (2006.01)
*B60L 15/20* (2006.01)
*B60L 7/10* (2006.01)

(56) References Cited

U.S. PATENT DOCUMENTS

| | | | |
|---|---|---|---|
| 2004/0207350 A1* | 10/2004 | Wilton | B60L 3/0046 318/376 |
| 2005/0007049 A1 | 1/2005 | Kim | |
| 2006/0046895 A1* | 3/2006 | Thacher | B60L 7/26 477/4 |
| 2010/0147184 A1* | 6/2010 | Kitanaka | B60L 7/14 105/61 |
| 2010/0275810 A1* | 11/2010 | Barbee | B61C 3/02 105/50 |
| 2011/0118924 A1* | 5/2011 | Nasu | B60L 15/2045 701/22 |
| 2013/0052490 A1* | 2/2013 | Tenhouten | B60H 1/00278 429/50 |
| 2013/0298883 A1* | 11/2013 | Archer | B60H 1/00271 123/568.12 |

FOREIGN PATENT DOCUMENTS

| | | |
|---|---|---|
| JP | 02-085057 A | 3/1990 |
| JP | 2000-198444 A | 7/2000 |
| JP | 2001-030903 A | 2/2001 |
| JP | 2001-204102 A | 7/2001 |
| JP | 2005-033981 A | 2/2005 |
| JP | 2005-160269 A | 6/2005 |
| JP | 2009-119963 A | 6/2009 |
| JP | 2009-183079 A | 8/2009 |
| JP | 2009-196404 A | 9/2009 |
| JP | 2009-225630 A | 10/2009 |

* cited by examiner

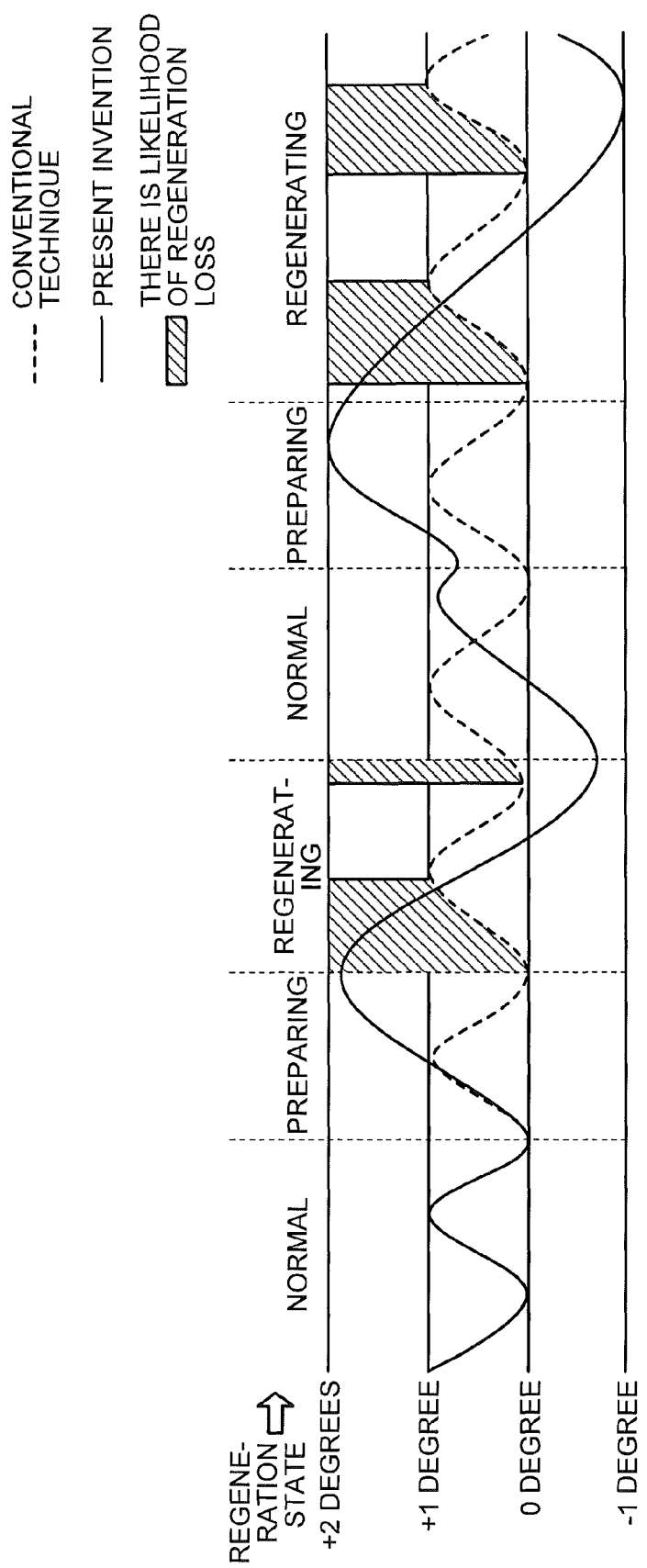

TRAIN-INFORMATION MANAGEMENT DEVICE AND DEVICE CONTROL METHOD

FIELD

The present invention relates to a train-information management device and, more particularly, relates to a train management device that efficiently uses regenerated power generated when an electrical brake is used.

BACKGROUND

A train-information management device collects and manages data regarding the conditions of various devices provided on each vehicle of a train, and it can control the individual devices on the basis of the collected condition data. Control target devices are power converters that convert electric power supplied from an overhead wire and then supply the converted power to the main electric motors and to auxiliary devices, and devices such as air conditioners, lighting equipment, and braking devices.

In recent years, trains have generally included a regenerative brake that brakes by using a main electric motor and then returns the electric power generated during the braking back to the overhead wire so as to be used by other trains. The regenerative brake has a problem in that when there are no other trains or the like that consume electric power in the vicinity of the braking train, the electric power cannot be returned to the overhead wire, which causes regeneration reduction or regeneration loss, and thus electric power generated by the regenerative brake cannot be effectively used. In order to solve the problem as described above, in the invention described in Patent Literature 1 listed below, when effective regenerative braking is lost, the pressure in a main air reservoir of an air brake is checked and if the pressure is lower than an appropriate value, an electrical brake (a regenerative brake) is operated in order to use electric power generated by the electrical brake to operate a compressor, thereby achieving effective utilization of the regenerated power.

CITATION LIST

Patent Literature

Patent Literature 1: Japanese Patent Application Laid-open No. 2009-119963

SUMMARY

Technical Problem

However, in the above conventional technique, electric power can be used only when the low pressure in the main air reservoir coincides with the regeneration loss. This results in a problem that the regenerated power cannot be effectively used.

The present invention has been made to solve the above problems, and an objective of the present invention is to provide a train-information management device and a device control method that reduces the probability of the regeneration being lost by controlling a device provided on a vehicle so as to be able to effectively use the regenerated power.

Solution to Problem

To solve the problem described above and achieve the objective, the present invention relates to a train-information management device that is provided on a train, that manages information on devices provided in a vehicle, and that controls each of the devices. The train-information management device includes: a position detection unit that detects a position of the train; a regenerating-condition detection unit that detects whether the train is in a condition of using a regenerative brake; a train-line information holding unit that holds therein information on a section in which a train is more likely to use a brake; an air-conditioning set-value holding unit that holds therein a temperature set value of an air conditioner; and a target-temperature control unit that decides a target temperature that is designated to the air conditioner on the basis of a detection result obtained by the position detection unit, a detection result obtained by the regenerating-condition detection unit, information held in the train-line information holding unit, and information held in the air-conditioning set-value holding unit. In a regeneration-preparation condition where a train is running through a position at which a distance between the position and a section in which a train is more likely to use a brake is equal to or less than a given value and is running toward the section, and where a train does not use a regenerative brake, the target-temperature control unit decides a value, generated by adding a predetermined value to the temperature set value, as the target temperature, in a regenerating condition where the train uses a regenerative brake, the target-temperature control unit decides a value, generated by subtracting a predetermined value from the temperature set value, as the target temperature, and in a normal condition that corresponds neither to the regeneration-preparation condition nor to the regenerating condition, the target-temperature control unit decides the temperature set value as the target temperature.

Advantageous Effects of Invention

According to the present invention, the electric power used inside the train, which is generated when a regenerative brake is used, increases, and therefore the amount of electric power to be returned to an overhead wire can be reduced. As a result, in a case where trains in the vicinity thereof and the like need only a small amount of electric power, the loss of regeneration can be reduced and the regenerated power can be more effectively used.

BRIEF DESCRIPTION OF DRAWINGS

FIG. 5 illustrates an example of variations in temperature within a vehicle (a compartment).

DESCRIPTION OF EMBODIMENTS

Exemplary embodiments of a train-information management device and a device control method according to the present invention will be described below in detail with reference to the accompanying drawings. The present invention is not limited to the embodiments.

First Embodiment

Figure 1:
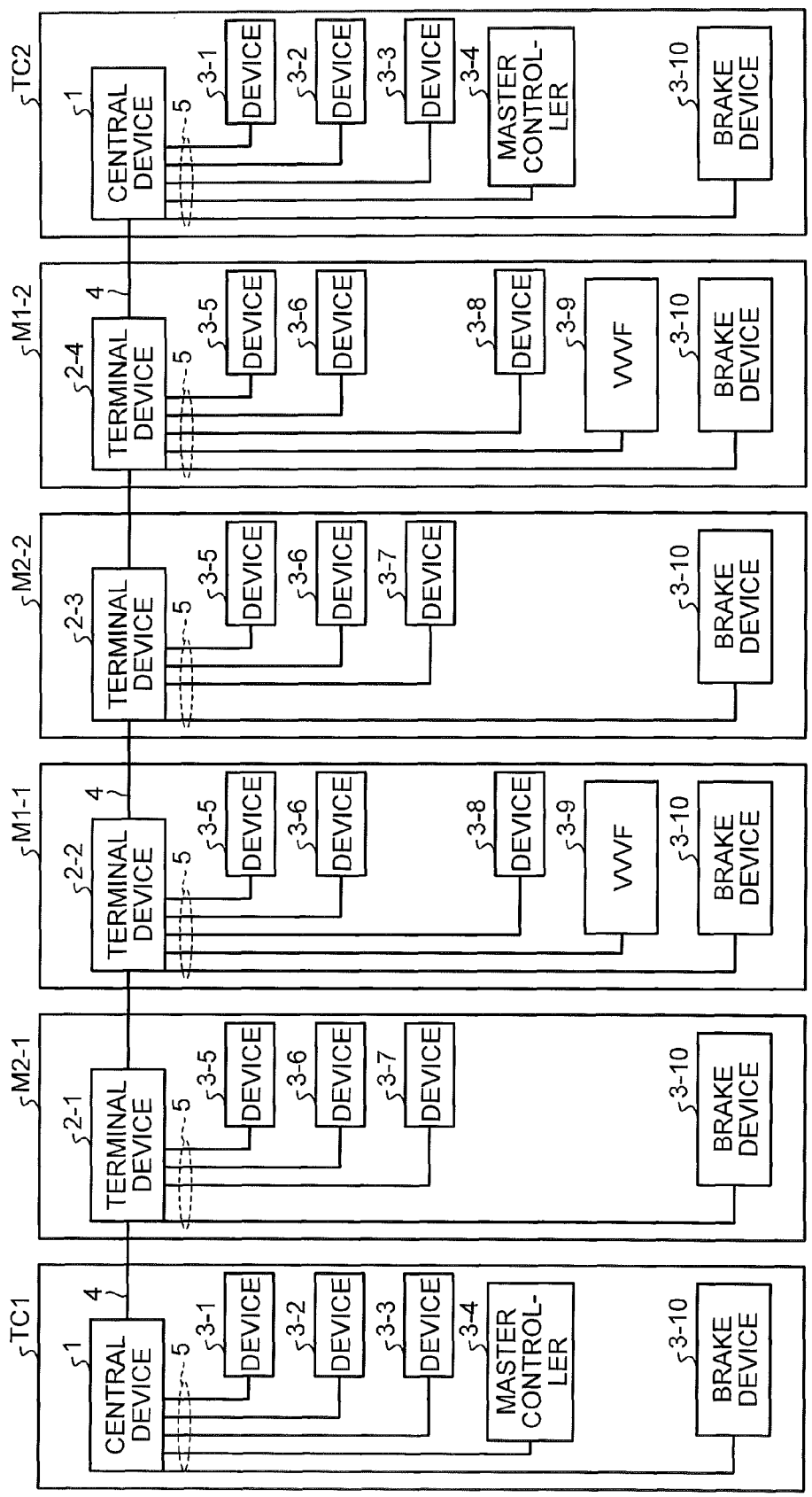
FIG. 1 illustrates an example of a formation of a train on which a train-information management device is mounted.

FIG. 1 illustrates an example of a formation of a train on which a train-information management device according to an embodiment of the present invention is mounted. In FIG. 1, the train formation includes six vehicles, for example, and its specific configuration is made up of vehicles TC1, M2-1, M1-1, M2-2, M1-2, and TC2.

A central device 1 of the train-information management device (hereinafter, simply referred to as "central device") is provided on each of the vehicles TC1 and TC2, which are provided at opposite ends of the formation, respectively. On the vehicles M2-1, M1-1, M2-2, and M1-2, which are provided in the middle of the formation, terminal devices 2-1, 2-2, 2-3, and 2-4 of the train-information management device (hereinafter, simply referred to as "terminal devices") are provided, respectively. The train-information management device according to the present embodiment includes the central devices 1 and the terminal devices 2-1 to 2-4. When the train runs, one of the vehicles TC1 and TC2 is the leading vehicle, and the other vehicle is the tail vehicle. The central devices 1 and the terminal devices 2-1 to 2-4 are connected through a trunk transmission path (a transmission path between vehicles) 4 provided across the vehicles, so as to be capable of communicating with each other.

The vehicle TC1 includes the central device 1; devices 3-1 to 3-3 that are connected to the central device 1, each through branch transmission paths (transmission paths within a vehicle) 5; a master controller 3-4 that is connected to the central device 1 via the branch transmission path 5; and an air conditioner 3-10 that is connected to the central device 1 via the branch transmission path 5. The branch transmission paths 5 are communication paths provided within a vehicle. The devices 3-1 to 3-3 are, for example, brake devices. The central device 1 transmits control information for controlling the devices 3-1 to 3-3 and the air conditioner 3-10 and also obtains device information (condition data) from the devices 3-1 to 3-3 and the air conditioner 3-10. The master controller 3-4 is controlled and managed by the central device 1 in the same manner as the devices 3-1 to 3-3. The master controller 3-4 transmits control information to the central device 1, such as accelerating notch information (acceleration information) and brake notch information (deceleration information), which are input from the motorman's cab (not illustrated).

The vehicle M2-1 includes the terminal device 2-1; devices 3-5 to 3-7 that are connected to the terminal device 2-1, each via the branch transmission paths 5; and the air conditioner 3-10, which is connected to the terminal device 2-1 via the branch transmission path 5. The devices 3-5 to 3-7 are, for example, brake devices. The terminal device 2-1 transmits control information for controlling the devices 3-5 to 3-7 and the air conditioner 3-10 and obtains device information (condition data) from the devices 3-5 to 3-7 and the air conditioner 3-10.

The vehicle M1-1 includes the terminal device 2-2; devices 3-5, 3-6, and 3-8 that are connected to the terminal device 2-2, each via the branch transmission paths 5; a VVVF 3-9, which is connected to the terminal device 2-2 through the branch transmission path 5; and the air conditioner 3-10, which is connected to the terminal device 2-2 through the branch transmission path 5. The devices 3-5, 3-6, and 3-8 are, for example, brake devices. The VVVF 3-9 is a variable voltage variable frequency (VVVF) inverter and controls the driving of a vehicle by varying the voltage and the frequency of a motor (not illustrated). The terminal device 2-2 transmits control information for controlling the devices 3-5, 3-6, and 3-8, the VVVF 3-9, and the air conditioner 3-10, and it obtains device information (condition data) from the devices 3-5, 3-6, and 3-8, the VVVF 3-9, and the air conditioner 3-10.

The vehicle TC2 has the same configuration as the vehicle TC1. The vehicle M2-2 has the same configuration as the vehicle M2-1. The terminal device 2-3 has the same function as the terminal device 2-1. The vehicle M1-2 has the same configuration as the vehicle M1-1. The terminal device 2-4 has the same function as the terminal device 2-2.

Figure 2:
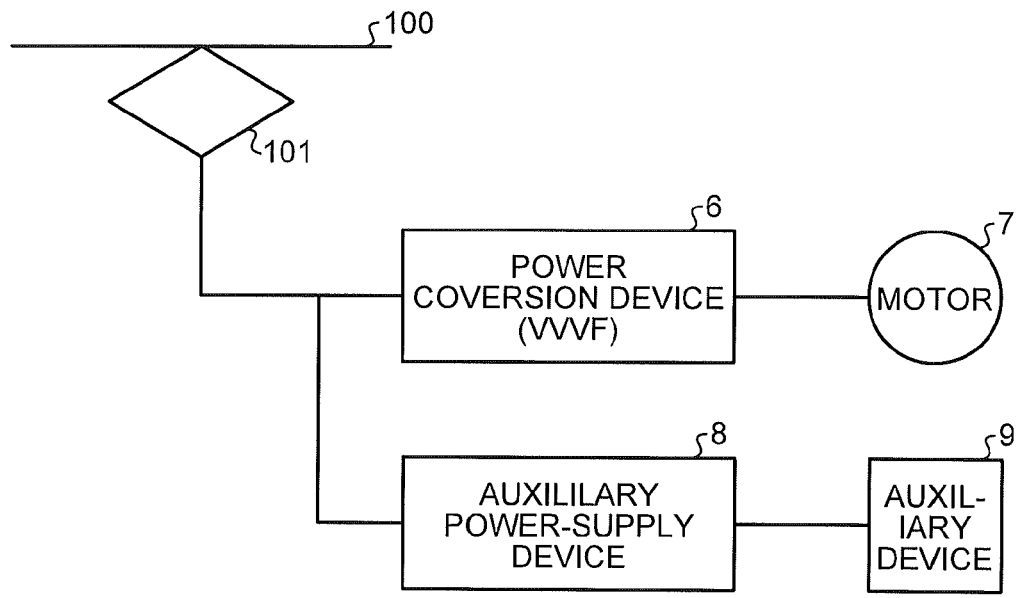
FIG. 2 illustrates an example of the connection of a power conversion device.

Although illustrations thereof are partially omitted from FIG. 1, a predetermined vehicle of the train includes a power conversion device 6 and an auxiliary power-supply device 8, both illustrated in FIG. 2, to convert electric power obtained from an overhead wire 100 by a power collector 101 so as to generate the drive power for a motor 7 and an auxiliary device 9. The power conversion device 6 corresponds to the VVVF 3-9 illustrated in FIG. 1. The power conversion device 6 and the motor 7 operate as a regenerative brake when a train is decelerated. The auxiliary power-supply device 8 normally converts electric power supplied from the overhead wire 100 to generate drive power for the auxiliary device 9. However, when a regenerative brake is used and thus power generation occurs, the auxiliary power-supply device 8 uses a part or all of the electric power (regenerated power) that is returned from the power conversion device 6 to the overhead wire 100 so as to generate the drive power for the auxiliary device 9.

Figure 3:
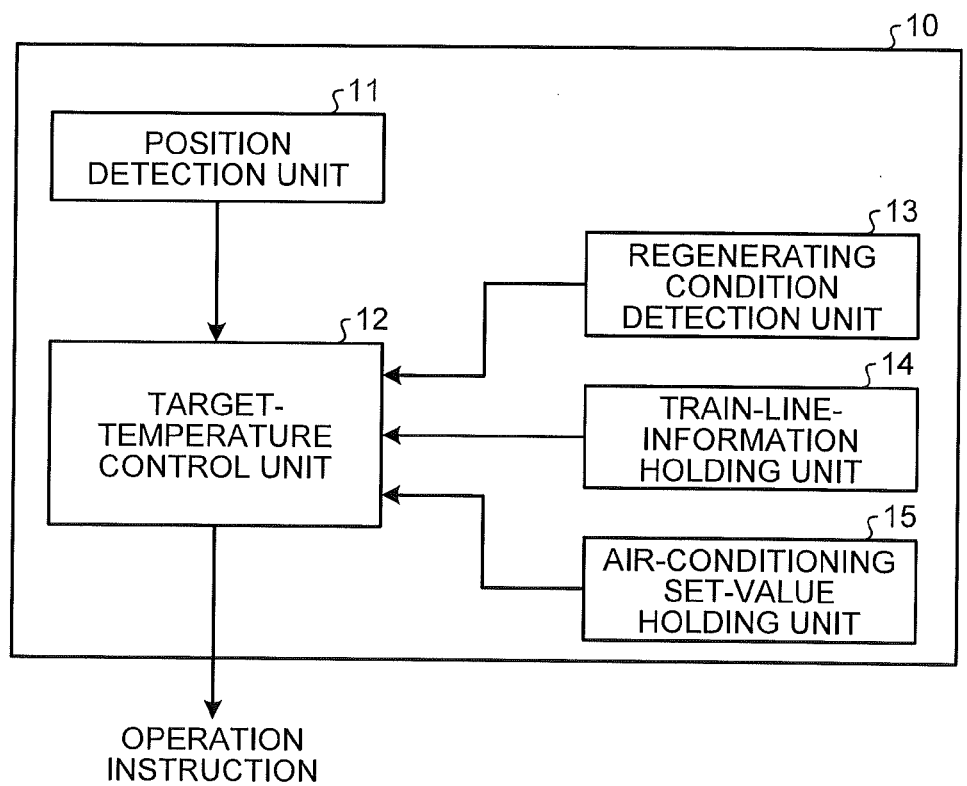
FIG. 3 illustrates an example of the configuration of a compressor-controlling function unit.

FIG. 3 illustrates an example of a configuration of an air-conditioner function-control unit 10 that makes up the train-information management device according to the present embodiment. The air-conditioner function-control unit 10 notifies, at a predetermined time (for example, at a given interval), an air conditioner provided on each vehicle of a target temperature and controls the air conditioner such that the temperature inside the vehicle becomes the target temperature.

As illustrated, the air-conditioner function-control unit 10 includes a position detection unit 11, a target-temperature control unit 12, a regenerating-condition detection unit 13, a train-line information holding unit 14, and an air-conditioning set-value holding unit 15.

The position detection unit 11 utilizes a detector on a vehicle, a detector on the ground, and a tacho-generator (all not illustrated), for example, so as to detect the position of the train running on a railway line. The position can be detected by using other methods.

The target-temperature control unit 12 generates information indicating the target temperature for inside a vehicle as control information, and it outputs the information to an air conditioner that is one of the devices illustrated in FIG. 1 to control the operation of the air conditioner.

The regenerating-condition detection unit 13 monitors the operating condition of the power conversion device 6 (see FIG. 2), and it determines whether the power conversion device 6 and the motor 7 are operating as a regenerative brake (whether the operating condition is a regenerating condition). For example, a bit indicating whether the power conversion device 6 is in a regenerating condition is output to the regenerating-condition detection unit 13, and the regenerating-condition detection unit 13 confirms the condition of this bit to determine the operating condition. The regenerating-condition detection unit 13 can be configured to monitor the motorman's operation result, and it can determine that the operating condition is in a regenerating condition when the motorman operates the brakes.

The train-line-information holding unit 14 holds therein information regarding a train line on which the train is running, and it specifically holds information on a section in which the train is more likely to use a brake such as a regenerative brake. Examples of such sections include a final section approaching a station, a downward-slope section, a speed-reducing section, and a temporary speed-limit section. An example of the information is the distance in kilometers between both ends of the section. Information that is more likely to be updated, such as information on the temporary speed-limit section, can be obtained from a system on the ground side by using a wireless communication device (not illustrated), and can be stored, each time the information is updated, in the train-line-information holding unit 14.

When a crew member or other person sets an indoor-temperature, the air-conditioning set-value holding unit 15 obtains and holds therein a temperature set value.

Next, a detailed operation of the air-conditioner function-control unit 10 in the train-information management device according to the present embodiment is described with reference to FIG. 4. For the sake of simplicity, a case where the air-conditioner function-control unit 10 controls only one air conditioner is described below.

The air-conditioner function-control unit 10 determines which of a regeneration-preparation condition, a regenerating condition, and a normal condition the train is in. Depending on the condition, the air-conditioner function-control unit 10 executes a different control on an air conditioner. The "regeneration-preparation condition" refers to a condition where a train is running through a position at which a train is more likely to use a regenerative brake soon, i.e., a condition where a train is running through a position at which the distance between this position and a section in which a train is more likely to use a regenerative brake is equal to or less than a given value while running toward the section. The "regenerating condition" refers to a condition in which a train uses a regenerative brake and a motor performs power generation. The "normal condition" refers to a condition other than the above conditions.

A specific operation of the air-conditioner function-control unit 10 is described below. The target-temperature control unit 12 in the air-conditioner function-control unit 10 monitors whether the time of outputting a designated temperature value (target temperature) to an air conditioner has been reached (Step S11). When the time of outputting a designated temperature value is reached (YES at Step S11), the target-temperature control unit 12 determines whether a train is in the regeneration-preparation condition on the basis of the detection result obtained by the position detection unit 11, the detection result obtained by the regenerating-condition detection unit 13, and the train-line information held in the train-line-information holding unit 14 (Step S12). When the train is running toward a section in which a train is more likely to use a regenerative brake, when the distance between the current position (the current position illustrated as the detection result obtained by obtained by the position detection unit 11) and the section in which a train is more likely to use a regenerative brake is equal to or less than a given value, and when the power conversion device 6 and the motor 7 do not operate as a regenerative brake, then the air-conditioner function-control unit 10 determines that the train is in the regeneration-preparation condition. When the train is in the regeneration-preparation condition (YES at Step S12), the air-conditioner function-control unit 10 outputs a value, which is generated by adding 1 degree (° C.) to a temperature set value held in the air-conditioning set-value holding unit 15, to the air conditioner (Step S13). After the designated temperature value is output, the operation of the air-conditioner function-control unit 10 shifts back to Step S11 to wait for the next time to output a designated temperature value.

When the train is not in the regeneration-preparation condition (NO at Step S12), the air-conditioner function-control unit 10 confirms whether the train is in the regenerating condition (Step S14). When the power conversion device 6 and the motor 7 operate as a regenerative brake, the air-conditioner function-control unit 10 determines that the train is in the regenerating condition. When the train is in the regenerating condition (YES at Step S14), the air-conditioner function-control unit 10 outputs a value, which is generated by subtracting 1 degree (° C.) from the temperature set value held in the air-conditioning set-value holding unit 15, to the air conditioner (Step S15). When the train is not in the regenerating condition (NO at Step S14), the air-conditioner function-control unit 10 determines that the train is in the normal condition, and it outputs the temperature set value held in the air-conditioning set-value holding unit 15 to the air conditioner as a designated temperature value (Step S16). After the designated temperature value is output during the regenerating condition and during the normal condition, the operation of the air-conditioner function-control unit 10 shifts back to Step S11 to wait for the next time to output a designated temperature value.

As described above, during the regeneration-preparation condition, the air-conditioner function-control unit 10 outputs a target temperature that is higher than the normal target temperature (in the normal condition) to an air conditioner so as to control the air-conditioner's operation. Also, in the regenerating condition, the air-conditioner function-control unit 10 outputs a target temperature that is lower than the normal target temperature to an air conditioner so as to control the air-conditioner's operation. Due to this control, in the regenerating condition where power generation is performed, the air conditioner can consume a larger amount of electric power.

Figure 4:
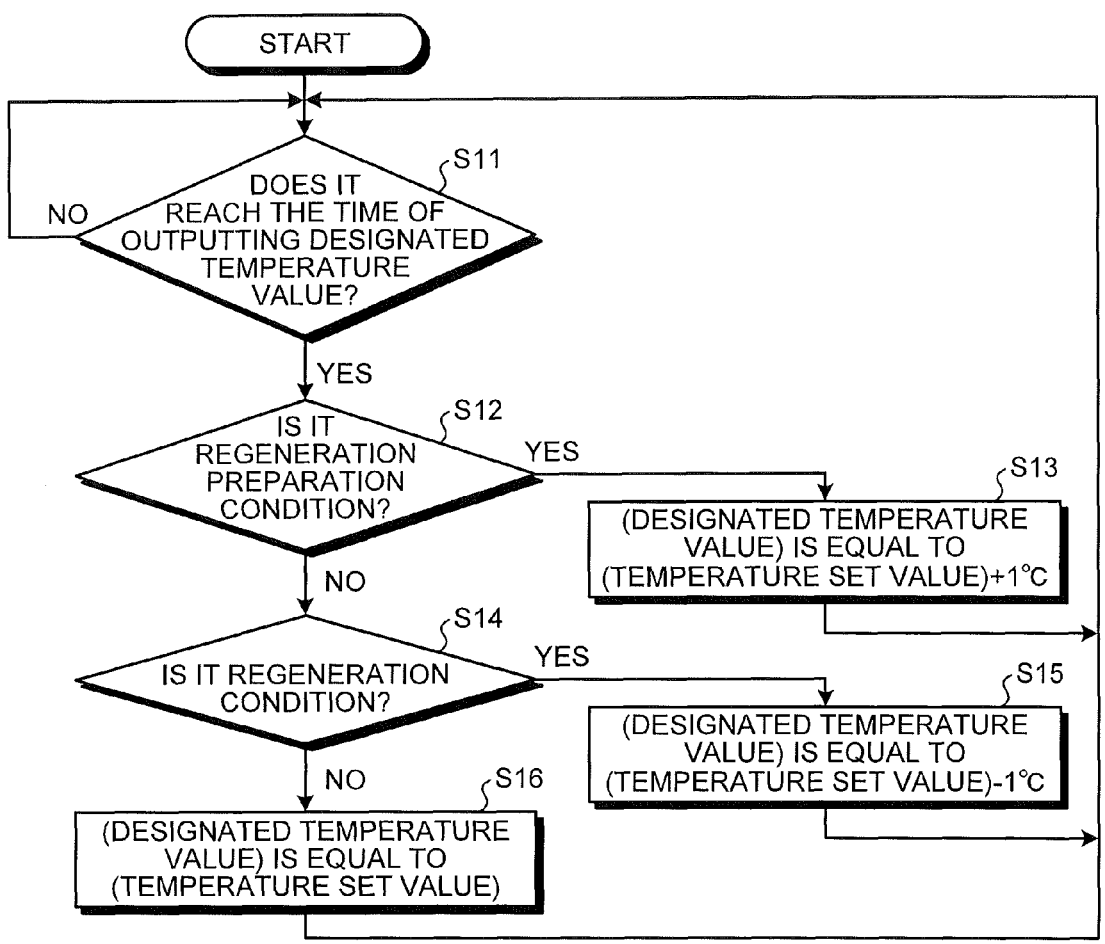
FIG. 4 is a flowchart illustrating an example of an operation of an air-conditioner function control unit.

Note that in the control illustrated in FIG. 4, although the adjustment amount for the normal designated temperature value is set to 1° C., the adjustment amount can be set to a different value. At Step S12 described above, the determination of whether the train is in the regeneration-preparation condition is performed on the basis of the train's current position and train-line information on the train. However, in addition to these pieces of information, the determination can also be performed in consideration of the speed of the train or the outside air temperature. For example, in a case when determining in consideration of the train speed, when the train is running at a high speed, the time (the position on a train line) of determining whether the train is in the regeneration-preparation condition is set earlier. Also, when the train is running at a low speed, the time of determining whether the train is in the regeneration-preparation condition is set later. In a case when determining in consideration of the outside air temperature, when the air temperature is high, the time of determining whether the train is in the regeneration-preparation condition is set later. Also, when the air temperature is low, the time of determining whether the train is in the regeneration-preparation condition is set earlier. Both the train speed and the air temperature can be considered simultaneously. By adjusting the determination time in consideration of the train speed or the air temperature, the air-conditioner function-control unit 10 can start the controlling in the regeneration-preparation condition at a more appropriate time. Therefore, the frequency at which a cooling operation is started in the regeneration-preparation condition is reduced, and accordingly a large amount of electric power can be consumed in the regenerating condition. The time of determining whether the train is in the regeneration-preparation condition can be adjusted according to the number of passengers as well as the actions described above.

In the present embodiment, there has been described a case where one air-conditioner function-control unit 10 controls one air conditioner. However, the air-conditioner function-control unit 10 can control two or more air conditioners. In such a case, the target-temperature control unit 12 in the air-conditioner function-control 10 outputs a designated temperature value to each air conditioner that is a control target.

Next, differences between the conventional air-conditioning controlling operation and the air-conditioning controlling operation performed by the train-information management device according to the present embodiment are described with reference to FIG. 5.

FIG. 5 illustrates an example of variations in temperature within a vehicle (a compartment). In FIG. 5, variations in temperature when controlled by the train-information management device according to the present embodiment (the control according to what is illustrated in FIG. 4) are illustrated by a solid line; and variations in temperature controlled by a conventional technique are illustrated by a broken line. The section illustrated by hatched lines is a section in which a regeneration loss is likely to occur during the conventional control. Here, it is assumed that the temperature set value held in the air-conditioning set-value holding unit 15 does not change.

In the conventional control technique, regardless of the position where the train is running and of the operating condition of a motor, the temperature set value held in the air-conditioning set-value holding unit 15 is output to an air conditioner as a designated temperature value. Accordingly, the temperature is adjusted so as to fall within the range between an air-conditioning set value (0 degree) and +1 degree. That is, when the temperature in a compartment increases from the air-conditioning set value that is a target value by 1 degree, the air conditioner starts a cooling operation (a heat-absorbing operation); and when the compartment temperature falls below the target value, the air conditioner stops (or weakens) the operation.

On the other hand, in the control executed by the train-information management device according to the present embodiment, in the normal condition (the condition that is neither in the regeneration-preparation condition nor in the regenerating condition, i.e., the "normal" section in FIG. 5), a temperature set value held in the air-conditioning set-value holding unit 15 is output to an air conditioner as a designated temperature value; and the air conditioner adjusts the temperature in a compartment so as to fall within the range between the air-conditioning set value (0 degree) and +1 degree. In the regeneration-preparation condition (the "preparing" section in FIG. 5), the value, which is generated by adding 1 to the temperature set value held in the air-conditioning set-value holding unit 15, is output to the air conditioner as a designated temperature value. As a result, until the compartment temperature increases from the air-conditioning set value (0 degree) by 2 degrees, the air conditioner does not start a cooling operation (or maintains the condition of a weaker cooling operation). When the compartment temperature increases from the air-conditioning set value by 2 degrees, the air conditioner starts a cooling operation (or strengthens the operation) to decrease the compartment temperature. When the compartment temperature decreases to the level that is higher than the air-conditioning set value by 1 degree, the air conditioner stops (or weakens) the cooling operation. Meanwhile, in the regenerating condition (the "regenerating" section in FIG. 5), the value, which is generated by subtracting 1 from the temperature set value held in the air-conditioning set-value holding unit 15, is output to the air conditioner as a designated temperature value. As a result, the air conditioner operates in such a manner that the compartment temperature decreases from the air-conditioning set value (0 degree) by 1 degree. Therefore, a cooling operation in the regeneration-preparation condition continues for a shorter duration; and a cooling operation in the regenerating condition has a longer duration accordingly. Consequently, a larger amount of electric power is consumed in the regenerating condition. When the regeneration-preparation condition is changed to the regenerating condition, the train-information management device (the air-conditioner function-control unit 10) outputs a value that is lower by 2 degrees than a previous value to an air conditioner, as a designated temperature value; and therefore the air conditioner immediately starts a cooling operation.

In FIG. 5, in a section where temperature is increasing, an air conditioner does not perform a cooling operation (a heat-absorbing operation), and therefore the power consumption inside a train is low. On the other hand, in a section where the temperature is decreasing, an air conditioner performs a cooling operation (a heat-absorbing operation), and therefore the power consumption inside a train is high. When the control by the train-information management device according to the present embodiment is applied, a larger amount of electric power is consumed in the regenerating condition, which can accordingly reduce the occurrence of the regeneration loss as compared with the application of the conventional control.

As described above, when a train approaches a section in which a train is more likely to use a regenerative brake, the train-information management device according to the present embodiment causes an air conditioner not to start a cooling operation in the regeneration-preparation condition until the compartment temperature increases more than the temperature at which a cooling operation is started in the normal condition. In the regenerating condition, the train-information management device causes an air conditioner to continue a cooling operation until the compartment temperature reaches a temperature lower than the original target value (the temperature set value held in the air-conditioning set-value holding unit 15). In this manner, the usage amount of electric power (regenerated power) generated by the regenerative brake is increased within the train as compared to the conventional control operation, and therefore the amount of electric power to be returned to the overhead wire can be reduced. Accordingly, the regeneration loss is likely to be reduced in a case when trains and the like in the vicinity need only a small amount of electric power, and accordingly the regenerated power can be effectively used.

In the present embodiment, a case is described where a plurality (six) of vehicles constitute one train formation. However, the number of vehicles that constitute one formation can be more than 6 or less than 6. The formation can also be constituted with a single vehicle.

The present embodiment has been described for the controlling operation when applied to an air conditioner used as a cooling device. However, the control operation can be applied also to an air conditioner used as a heater, and thus the amount of regenerated power used in the train can be increased when compared with the conventional control operation. That is, when an air conditioner is used as a heater, during the regeneration-preparation condition, a designated temperature value to be output to the air conditioner can be adjusted to be lower than that in the normal condition by 1 degree; and in the regenerating condition, the designated temperature value can be adjusted higher than that in the normal condition by 1 degree.

INDUSTRIAL APPLICABILITY

As described above, the train-information management device according to the present invention is useful for achieving a more economical electric railway system that is capable of effectively using regenerated power.

REFERENCE SIGNS LIST 1 central device, 2-1 to 2-4 terminal device, 3-1 to 3-3, 3-5 to 3-8 device, 3-4 master controller, 3-9 VVVF, 3-10 air conditioner, 4 trunk transmission path, 5 branch transmission path, 6 power conversion device (VVVF), 7 motor, 8 auxiliary power-supply device, 9 auxiliary device, 10 air-conditioner function-control unit, 11 position detection unit, 12 target-temperature control unit, 13 regenerating-condition detection unit, 14 train-line-information holding unit, 15 air-conditioning set-value holding unit.

The invention claimed is:

1. A train-information management device that is provided on a train, that manages information on devices provided in a vehicle, and that controls each of the devices, the train-information management device comprising:
   a position detection unit that detects a position of the train;
   a regenerating-condition detection unit that detects whether the train is in a condition of using a regenerative brake;
   a train-line information holding unit that holds therein information on a section in which a train is more likely to use a brake;
   an air-conditioning set-value holding unit that holds therein a temperature set value of an air conditioner; and
   a target-temperature control unit that decides a target temperature that is designated to the air conditioner on the basis of a detection result obtained by the position detection unit, a detection result obtained by the regenerating-condition detection unit, information held in the train-line information holding unit, and information held in the air-conditioning set-value holding unit, wherein
   in a regeneration-preparation condition
      where a train is running through a position at which a distance between the position and a section in which a train is more likely to use a brake is equal to or less than a given value and is running toward the section, and where a train does not use a regenerative brake, the target-temperature control unit decides a value, generated by adding a predetermined value to the temperature set value, as the target temperature,
   in a regenerating condition where the train uses a regenerative brake, the target-temperature control unit decides a value, generated by subtracting a predetermined value from the temperature set value, as the target temperature, and
   in a normal condition that corresponds neither to the regeneration-preparation condition nor to the regenerating condition, the target-temperature control unit decides the temperature set value as the target temperature.

2. The train-information management device according to claim 1, wherein when the air conditioner is in a cooling operation, the predetermine value is set to be a positive number, and when the air conditioner is in a heating operation, the predetermined value is set to be a negative number.

3. A device control method in a train-information management device that is provided on a train, that manages information on devices provided in a vehicle, and that controls each of the devices, the device control method comprising:
   a condition determining of determining, on the basis of a position of the train, a usage status of a regenerative brake, and information on a section in which a train is more likely to use a brake, which of
      a regeneration-preparation condition in which the train is running through a position at which distance between the position and a section in which the train is more likely to use a brake is equal to or less than a given value, and is running toward the section, and in which a train does not use a regenerative brake,
      a regenerating condition in which the train uses a regenerative brake, and
      a normal condition that corresponds neither to the regeneration-preparation condition nor to the regenerating condition,
   the train is in;
   a first controlling of generating a value by adding a predetermined value to a temperature set value held in advance, and outputting the value to an air conditioner as a target temperature that is designated to the air conditioner when the train is in the regeneration-preparation condition;
   a second controlling of generating a value by subtracting a predetermined value from the temperature set value, and outputting the value to the air conditioner as the target temperature when the train is in the regenerating condition; and
   a third controlling of outputting the temperature set value to the air conditioner as the target value when the train is in the normal condition.

4. The device control method according to claim 3, wherein when the air conditioner is in a cooling operation, the predetermine value is set to be a positive number, and when the air conditioner is in a heating operation, the predetermined value is set to be a negative number.

* * * * *